United States Patent
Barton et al.

(10) Patent No.: US 9,760,289 B2
(45) Date of Patent: Sep. 12, 2017

(54) MASSIVELY SCALABLE OBJECT STORAGE FOR STORING OBJECT REPLICAS

(71) Applicant: Rackspace US, Inc., San Antonio, TX (US)

(72) Inventors: Michael Barton, San Antonio, TX (US); Will Reese, San Antonio, TX (US); John A. Dickinson, Schertz, TX (US); Jay B. Payne, San Antonio, TX (US); Charles B. Thier, San Antonio, TX (US); Gregory Holt, Hollywood Park, TX (US)

(73) Assignee: Rackspace US, Inc., San Antonio, TX (US)

( * ) Notice: Subject to any disclaimer, the term of this patent is extended or adjusted under 35 U.S.C. 154(b) by 0 days.

(21) Appl. No.: 14/822,749

(22) Filed: Aug. 10, 2015

(65) Prior Publication Data

US 2016/0070481 A1   Mar. 10, 2016

Related U.S. Application Data

(63) Continuation of application No. 14/026,207, filed on Sep. 13, 2013, now Pat. No. 9,116,629, which is a
(Continued)

(51) Int. Cl.
*G06F 17/30* (2006.01)
*G06F 3/06* (2006.01)
(Continued)

(52) U.S. Cl.
CPC .......... *G06F 3/0608* (2013.01); *G06F 3/067* (2013.01); *G06F 3/0619* (2013.01);
(Continued)

(58) Field of Classification Search
CPC .... G06F 3/0608; G06F 3/0631; G06F 9/5083; G06F 3/0644; G06F 17/30197;
(Continued)

(56) References Cited

U.S. PATENT DOCUMENTS 6,363,495 B1 *  3/2002  MacKenzie ......... G06F 11/1482
                                                           714/37
6,446,092 B1    9/2002  Sutter
(Continued)

FOREIGN PATENT DOCUMENTS

EP         2239886       10/2010

OTHER PUBLICATIONS

European Search Report received in European Application No. 12001564.9, dated Nov. 28, 2012, 5 pages.
(Continued)

*Primary Examiner* — Leslie Wong
(74) *Attorney, Agent, or Firm* — Dykema Gossett P.L.L.C.

(57) ABSTRACT

An example method for storing data includes providing a plurality of physical storage pools, each storage pool including a plurality of storage nodes coupled to a network. The method also includes mapping a partition of a plurality of partitions to a set of physical storage pools, where each physical storage pool of the set of physical storage pools is located in a different availability zone, and the storage nodes within an availability zone are subject to a correlated loss of access to stored data. The method further includes receiving a data management request over the network, the data management request being associated with a data object. The method also includes identifying a first partition of the plurality of partitions corresponding to the received data management request and manipulating the data object in the
(Continued)

physical storage pools mapped to the first partition in accordance with the data management request.

16 Claims, 7 Drawing Sheets

Related U.S. Application Data continuation of application No. 13/089,442, filed on Apr. 19, 2011, now Pat. No. 8,538,926.

(60) Provisional application No. 61/450,166, filed on Mar. 8, 2011.

(51) Int. Cl.
*G06F 9/50* (2006.01)
*H04L 29/08* (2006.01)
*H04L 12/927* (2013.01)

(52) U.S. Cl.
CPC .......... *G06F 3/0631* (2013.01); *G06F 3/0641* (2013.01); *G06F 3/0644* (2013.01); *G06F 9/5083* (2013.01); *G06F 17/30197* (2013.01); *G06F 17/30575* (2013.01); *H04L 47/80* (2013.01); *H04L 67/10* (2013.01); *H04L 67/1095* (2013.01); *H04L 67/1097* (2013.01); *H04L 67/1006* (2013.01); *H04L 67/1023* (2013.01); *Y10S 707/9994* (2013.01); *Y10S 707/99953* (2013.01)

(58) Field of Classification Search
CPC .. G06F 3/0641; G06F 17/30575; G06F 3/067; H04L 67/1095; H04L 67/1097
See application file for complete search history.

(56) References Cited

U.S. PATENT DOCUMENTS

| | | | |
|---|---|---|---|
| 7,363,454 B2* | 4/2008 | Cannon | G06F 3/0605 707/999.2 |
| 7,685,109 B1* | 3/2010 | Ransil | G06F 17/30336 707/999.003 |
| RE42,860 E | 10/2011 | Velez-McCaskey et al. | |
| 8,046,424 B2 | 10/2011 | Novik et al. | |
| 8,307,028 B2 | 11/2012 | Kakivaya et al. | |
| 2002/0027886 A1 | 3/2002 | Fischer et al. | |
| 2002/0114341 A1 | 8/2002 | Sutherland et al. | |
| 2003/0187945 A1 | 10/2003 | Lubbers et al. | |
| 2004/0044854 A1* | 3/2004 | Gibble | G06F 3/0608 711/154 |
| 2004/0122845 A1* | 6/2004 | Lohman | G06F 17/30584 |
| 2005/0044108 A1 | 2/2005 | Shah et al. | |
| 2005/0223047 A1 | 10/2005 | Shah et al. | |
| 2006/0031933 A1 | 2/2006 | Costa et al. | |
| 2006/0088039 A1 | 4/2006 | Kakivaya et al. | |
| 2006/0184473 A1 | 8/2006 | Eder | |
| 2006/0193632 A1 | 8/2006 | Risbood | |
| 2006/0195672 A1* | 8/2006 | Inoue | G06F 3/0607 711/170 |
| 2006/0282547 A1 | 12/2006 | Hasha | |
| 2007/0028244 A1* | 2/2007 | Landis | G06F 9/5016 718/108 |
| 2007/0067366 A1* | 3/2007 | Landis | G06F 12/109 |
| 2007/0094357 A1 | 4/2007 | Sugitani et al. | |
| 2007/0168336 A1* | 7/2007 | Ransil | G06F 17/3089 |
| 2007/0168516 A1 | 7/2007 | Liu et al. | |
| 2007/0168634 A1* | 7/2007 | Morishita | G06F 3/0608 711/170 |
| 2007/0282915 A1* | 12/2007 | Vosshall | G06F 17/30575 |
| 2008/0052322 A1 | 2/2008 | Gusciora | |
| 2009/0006888 A1 | 1/2009 | Bernhard et al. | |
| 2009/0063516 A1* | 3/2009 | Wang | H04L 41/0893 |
| 2009/0172139 A1 | 7/2009 | Wong et al. | |
| 2009/0216910 A1 | 8/2009 | Duchesneau | |
| 2010/0103781 A1 | 4/2010 | Rai et al. | |
| 2010/0115009 A1 | 5/2010 | Callahan et al. | |
| 2010/0118895 A1 | 5/2010 | Radulescu | |
| 2010/0131649 A1 | 5/2010 | Ferris | |
| 2010/0199042 A1 | 8/2010 | Bates et al. | |
| 2010/0246578 A1* | 9/2010 | Zhong | H04L 67/1095 370/390 |
| 2010/0251002 A1 | 9/2010 | Sivasubramanian et al. | |
| 2010/0262717 A1* | 10/2010 | Critchley | H04L 12/42 709/251 |
| 2010/0262803 A1* | 10/2010 | Uchida | H04L 67/1097 711/172 |
| 2010/0293333 A1 | 11/2010 | Krishnaprasad et al. | |
| 2010/0306280 A1 | 12/2010 | Sapek | |
| 2010/0306354 A1 | 12/2010 | DeHaan et al. | |
| 2011/0016124 A1* | 1/2011 | Isaacson | H04L 9/0894 707/737 |
| 2011/0022812 A1* | 1/2011 | van der Linden | G06F 9/5077 711/163 |
| 2011/0145200 A1* | 6/2011 | Milby | G06F 3/0622 707/654 |
| 2011/0145538 A1* | 6/2011 | Yoshioka | G06F 3/0608 711/171 |
| 2011/0161293 A1 | 6/2011 | Vermeulen et al. | |
| 2011/0184920 A1 | 7/2011 | Vosshall et al. | |
| 2011/0320403 A1 | 12/2011 | O'Krafka et al. | |
| 2012/0036237 A1 | 2/2012 | Hasha et al. | |
| 2012/0047164 A1* | 2/2012 | Saadat | G06F 17/30321 707/769 |
| 2012/0109944 A1* | 5/2012 | Hao | G06F 17/30867 707/723 |
| 2012/0110173 A1 | 5/2012 | Luna et al. | |
| 2012/0159234 A1* | 6/2012 | Mehta | H04L 41/0663 714/4.11 |
| 2012/0185437 A1 | 7/2012 | Pavlov et al. | |
| 2013/0013571 A1 | 1/2013 | Sorenson, III et al. | |
| 2014/0258499 A9* | 9/2014 | Calder | H04L 67/1002 709/224 |

OTHER PUBLICATIONS

European Search Report received in European Application No. 12001563.1, dated Mar. 4, 2013, 11 pages.
International Search Report and Written Opinion issued for PCT/US2013/029274 dated Jun. 21, 2013, 12 pages.
Cordeiro et al., "Open Source Cloud Computing Platforms," 2010 Ninth International Conference on Grid and Cloud Computing, Nov. 1, 2010, pp. 366-371, Piscataway, NJ, USA.
Crago et al., "Heterogeneous Cloud Computing," 2011 IEEE International Conference on Cluster Computing, Sep. 26, 2011, pp. 378-385.
Llorente et al., "Cloud Computing for on-Demand Grid Resource Provisioning," High Speed and Large Scale Scientific Computing, IOS Press Jan. 1, 2009, pp. 177-191, Amsterdam, NL.

* cited by examiner

MASSIVELY SCALABLE OBJECT STORAGE FOR STORING OBJECT REPLICAS

CROSS-REFERENCE TO RELATED APPLICATIONS

The present application is a continuation of U.S. patent application Ser. No. 14/026,207, filed Sep. 13, 2013, which is a continuation of U.S. patent application Ser. No. 13/089,442, filed Apr. 19, 2011, entitled "Massively Scalable Object Storage For Storing Object Replicas," which claims benefit of U.S. Provisional Patent Application No. 61/450,166, filed Mar. 8, 2011, entitled "Massively Scalable File Storage System." The entirety of these disclosures is hereby incorporated by reference.

BACKGROUND

The present disclosure relates generally to cloud computing, and more particularly to a massively scalable object storage system to provide storage for a cloud computing environment.

Cloud computing is location-independent computing, whereby shared servers provide resources, software, and data to computers and other devices on demand. As a term, "cloud computing" describes a consumption and delivery model for IT services based on the Internet, and it typically involves over-the-Internet provisioning of dynamically scalable and often virtualized resources. This frequently takes the form of web-based tools or applications that users can access and use through a web browser as if it were a program installed locally on their own computer. Details are abstracted from consumers, who no longer have need for expertise in, or control over, the technology infrastructure "in the cloud" that supports them. Most cloud computing infrastructures consist of services delivered through common centers and built on servers. Clouds often appear as single points of access for consumers' computing needs.

As the use of cloud computing has grown, cloud service providers such as Rackspace Hosting Inc. of San Antonio, Tex., have been confronted with the need to greatly expand file storage capabilities rapidly while making such expansions seamless to their users. Conventional file storage systems and methods to expand such systems suffer from several limitations that can jeopardize data stored in the object storage system. In addition, known techniques use up substantial resources of the object storage system to accomplish expansion while also ensuring data safety. Finally, the centralization of data storage brings with it issues of scale. A typical local storage system (such as the hard drive in a computer) may store thousands or millions of individual files for a single user. A cloud-computing-based storage system is designed to address the needs of thousands or millions of different users simultaneously, with corresponding increases in the number of files stored.

Accordingly, it would be desirable to provide an improved scalable object storage system.

SUMMARY

According to one embodiment, the improved scalable object storage system includes a method for storing data, comprising providing a plurality of physical storage pools, each storage pool including a plurality of storage nodes coupled to a network, each storage node further providing a non-transient computer readable medium for data storage; classifying a plurality of availability zones, wherein the storage nodes within an availability zone are subject to a correlated loss of access to stored data; defining a plurality of abstract partitions, wherein each possible input data management request deterministically corresponds to one of the plurality of abstract partitions; mapping the plurality of abstract partitions to the plurality of physical storage pools such that each mapped physical storage pool includes a replica of the data associated with the associated mapped abstract partition, and each replica for a particular abstract partition is mapped to a physical storage pool in a different availability zone; receiving a data management request over the network, the data management request associated with a data object; identifying a first partition corresponding to the received data management request; and manipulating the data object in the physical storage pools mapped to the first partition in accordance with the data management request.

According to another embodiment, the improved scalable object storage system includes a distributed storage coupled to a network, the distributed storage including a first storage pool and a second storage pool from a plurality of storage pools, the first storage pool in a first availability zone and the second storage pool in a second availability zone, each storage pool including at least one processor, a computer readable medium, and a communications interface; a director coupled to the network, the director including a processor, a computer readable medium, and a communications interface; a ring structure associated with the director, wherein the ring structure is adapted to associate a storage request with a first abstract partition from a plurality of abstract partitions, and wherein the ring structure is further adapted to selectively associate a first abstract partition with a first fault-tolerant multi-master replication target, the first replication target including the first storage pool and the second storage pool; wherein the director is adapted to route inbound storage requests to the replication target and outbound storage responses from the replication target.

According to another embodiment, the improved scalable object storage system includes a non-transient computer readable medium containing executable instructions, which when executed on a processor at a first time, initialize a ring by retrieving a set of ring parameters, the ring parameters including a number of abstract partitions, a number of physical storage pools, and a set of performance constraints; performing a consistent hashing function associating a first range of inputs with a first abstract partition and a second range of inputs with a second abstract partition; and allocating the available physical storage pools by mapping each abstract partition to one or more storage pools in accordance with the set of performance constraints; at a second time, opaquely route an input request to a correct storage pool in accordance with the initialized ring; and at a third time, rebalance the ring by retrieving the set of ring parameters, performing a consistent hashing function associating the range of inputs with the first abstract partition and the second range of inputs with the second abstract partition; and allocating the available storage pools mapping each abstract partition to one or more storage pools in accordance with the set of performance constraints such that each abstract partition has zero or one changes in the physical storage pools allocated thereto.

According to another embodiment, the improved scalable object storage system includes a system for coordinating events in a distributed system, comprising a plurality of subsidiary nodes coupled to a network, each subsidiary node including at least one processor, a computer-readable medium, and a communications interface, wherein information in a first subsidiary node needs to be synchronized with the information in a second subsidiary node in response to a time-varying series of requests; a first gateway, including a first processor, a first local clock, and a first communications interface; a second gateway, including a second processor, a second local clock, and a second communications interface; a timekeeping node coupled to the network, including a master clock; and a synchronization rectifier coupled to the first and second subsidiary nodes; wherein the timekeeping node is operationally coupled to the first and second gateways to reduce clock skew between the master clock, the first local clock and the second local clock below a configurable threshold; wherein the first gateway uses the first processor to timestamp a first request received over the first communications interface according to the time of the first local clock with a granularity at least equal to the configurable threshold; wherein the second gateway uses the second processor to timestamp a second request received over the second communications interface according to the time of the second local clock with a granularity at least equal to the configurable threshold; wherein synchronization between the first subsidiary node and the second subsidiary node is controlled by the later-occurring request if the first request and the second request are separated by a time greater than the configurable threshold; and wherein synchronization between the first subsidiary node and the second subsidiary node is controlled by the synchronization rectifier if the first request and the second request are separated by a time smaller than the configurable threshold.

According to another embodiment, the improved scalable object storage system includes a method for coordinating events in a distributed system, comprising synchronizing a master clock to coordinated universal time within a master skew threshold; synchronizing a first local clock at a first gateway with the master clock within a system skew threshold, and synchronizing a second local clock at a second gateway with the master clock within the system skew threshold; receiving, at the first gateway, a first request to manipulate a non-volatile data storage, and marking the first request with the time of reception according to the first local clock, with a granularity at least equal to the system skew threshold; receiving, at the second gateway, a second request to manipulate the non-volatile data storage, and marking the second request with the time of reception according to the second local clock, with a granularity at least equal to the system skew threshold; evaluate the first request and the second request to determine if they are unambiguously ordered by determining if the first request and the second request are temporally ordered with a granularity greater than the system skew threshold; if the first request and the second request are unambiguously ordered, modifying the non-volatile data storage as directed in the later request; and if the first request and the second request are not unambiguously ordered, modifying the non-volatile data storage as directed by a deterministic tiebreaker.

According to another embodiment, the improved scalable object storage system includes a non-transient computer readable medium containing executable instructions, which when executed on a processor synchronize a first local clock with a second local clock within a system skew threshold; receive a first request to manipulate a system resource and marks the first request with the time of reception according to the first local clock, with a granularity at least equal to the system skew threshold; receive a second request to manipulate the system resource and marks the second request with the time of reception according to the second local clock, with a granularity at least equal to the system skew threshold; evaluate the first request and the second request to determine if they are unambiguously ordered by determining if the first request and the second request are temporally ordered with a granularity greater than the system skew threshold; if the first request and the second request are unambiguously ordered, manipulates the system resource as directed in the later request; and if the first request and the second request are not unambiguously ordered, executes tiebreaker instructions controlling the system resource; and returns a success or error depending on the outcome of the tiebreaker instructions.

According to another embodiment, the improved scalable object storage system includes a method for managing data items in a distributed storage pool, comprising providing a plurality of physical storage pools, each storage pool including a plurality of storage nodes coupled to a network, each storage node further providing a non-transient computer readable medium for data storage; storing a first replica of a data item in a first physical storage pools, and storing a second replica of the data item in a second physical storage pool; in response to receiving a modification instruction for the data item, selectively modifying the first replica of the data item, creating a first modification sentinel file, and storing the first modification sentinel file in the first physical storage pool; in response to encountering the first modification sentinel file during a data item replication process, modifying the second replica of the data item and creating a second modification sentinel file in the second physical storage pool.

According to another embodiment, the improved scalable object storage system includes a system for out-of-band communication of object storage metadata, the system comprising a distributed storage system coupled to a network, the distributed storage including a first storage pool and a second storage pool from a plurality of storage pools, the first and second storage pools each including at least one processor, a computer readable medium, and a communications interface; wherein the first storage pool includes a first replica of a data item, and the second storage pool includes a second replica of the data; an object service responsive to modification instructions; and a replicator adapted to create a second replica of the data item in the second storage pool; wherein the object service responds to an out-of-band instruction by selectively modifying the first replica of the data item, creating a first modification sentinel file, and storing the first modification sentinel file in the first physical storage pool; and wherein the replicator responds to encountering the first modification sentinel file during a data item replication process by modifying the second replica of the data item and creating a second modification sentinel file in the second physical storage pool.

According to another embodiment, the improved scalable object storage system includes a non-transient computer readable medium containing executable instructions, which when executed on a processor at a first time, run a replication procedure that takes a first copy of a data item in a first location and makes an identical second copy of the data item in a second location; at a second time, run an out-of-band modification procedure to selectively modify the first copy of the data item, create a first modification sentinel file, and store the first modification sentinel file in the first location; and at a third time, change the execution of the replication procedure to modify a the second copy of the data item and create a second modification sentinel file in the second location.

According to another embodiment, the improved scalable object storage system includes a non-transient computer readable medium containing executable instructions, which when executed on a processor at a first time, run a replication procedure that takes a first copy of a data item in a first location and makes an identical second copy of the data item in a second location; at a second time, run an out-of-band modification procedure to selectively modify the first copy of the data item, create a first modification sentinel file, and store the first modification sentinel file in the first location; and at a third time, change the execution of the replication procedure to modify a the second copy of the data item and create a second modification sentinel file in the second location.

According to another embodiment, the improved scalable object storage system includes a distributed information synchronization system, comprising a first subsidiary node coupled to a network, the first subsidiary node including a first non-transitory computer-readable medium wherein the first computer-readable medium includes a first structured information repository, and wherein information in the first structured information repository is subject to internal consistency constraints; a second subsidiary node coupled to a network, the second subsidiary node including a second non-transitory computer-readable medium wherein the second computer-readable medium includes a second structured information repository, and wherein information in the second structured information repository is subject to internal consistency constraints; a repository synchronizer coupled to the first and second structured information repositories; the repository synchronizer further including a consistency evaluation module adapted to evaluate the differences between the first structured information repository and the second structured information repository; an internal modification module adapted to modify the internal structures of a structured information repository; an external replication module adapted to delete a target structured information repository and replace it with a replicated copy of a source structured information repository; and a threshold comparator; wherein the repository synchronizer is adapted to evaluate the first and second structured information repositories and determine a level of difference and compare the level of difference to a configurable threshold using the threshold comparator; if the level of difference is above the configurable threshold, modify the internal structures of a selected structured information repository using the internal modification module; and if the level of difference is below the configurable threshold, delete the selected structured information repository and replace it with a replicated copy of a consistent structured information repository using the external replication module.

According to another embodiment, the improved scalable object storage system includes a method for synchronizing structured information in a distributed system, comprising storing a first structured information repository on a first non-transitory computer-readable medium, wherein information in the first structured information repository is subject to internal consistency constraints; storing a second structured information repository on a second non-transitory computer-readable medium, wherein information in the second structured information repository is subject to internal consistency constraints; evaluating the differences between the first structured information repository and the second structured information repository to determine a preferred state and a difference measurement quantifying a difference from the preferred state; determining whether the difference measurement exceeds a configurable threshold; modifying a selected structured information repository if the difference measurement for the selected structured information repository is less than the configurable threshold, wherein the modification of the selected structured information repository is subject to the internal consistency constraints of the selected structured information repository, deleting the selected structured information repository if the difference measurement for the selected structured information repository is greater than the configurable threshold, and replacing the selected structured information repository with a replica of a structured information repository in the preferred state, wherein either modifying the selected structured information repository or deleting and replacing the structured information repository changes the non-transitory computer-readable medium storing the selected structured information repository such that the selected structured information repository is both compliant with its internal consistency constraints and in the preferred state. The method may also include determining that both the first structured information repository and the second structured information repository are not in the preferred state; pre-selecting the structured information repository that is closer to the preferred state and modifying the pre-selected structured information repository to bring the pre-selected structured information repository to the preferred state, subject to the internal consistency requirements of the pre-selected structured information repository, regardless of the configurable threshold.

According to another embodiment, the improved scalable object storage system includes a non-transient computer readable medium containing executable instructions, which when executed on a processor update a first structured information repository on a first non-transitory computer-readable medium, subject to internal consistency constraints; update a second structured information repository on a second non-transitory computer-readable medium, subject to internal consistency constraints; evaluate the differences between the first structured information repository and the second structured information repository to determine a preferred state and a difference measurement quantifying a difference from the preferred state; determine whether the difference measurement exceeds a configurable threshold; modify a selected structured information repository if the difference measurement for the selected structured information repository is less than the configurable threshold, subject to the internal consistency constraints of the selected structured information repository, delete the selected structured information repository if the difference measurement for the selected structured information repository is greater than the configurable threshold, and replace the selected structured information repository with a replica of a structured information repository in the preferred state.

According to another embodiment, the improved scalable object storage system includes a non-transient computer readable medium containing executable instructions, which when executed on a processor update a first structured information repository on a first non-transitory computer-readable medium, subject to internal consistency constraints; update a second structured information repository on a second non-transitory computer-readable medium, subject to internal consistency constraints; evaluate the differences between the first structured information repository and the second structured information repository to determine a preferred state and a difference measurement quantifying a difference from the preferred state; determine whether the difference measurement exceeds a configurable threshold; modify a selected structured information repository if the difference measurement for the selected structured information repository is less than the configurable threshold, subject to the internal consistency constraints of the selected structured information repository, delete the selected structured information repository if the difference measurement for the selected structured information repository is greater than the configurable threshold, and replace the selected structured information repository with a replica of a structured information repository in the preferred state.

The specifics of these embodiments as well as other embodiments are described with particularity below.

BRIEF DESCRIPTION OF THE DRAWINGS

FIG. 1b is a schematic view illustrating an embodiment of an information handling system used in the file storage system of FIG. 1a.

FIG. 2 is a schematic view illustrating an embodiment of a logical structure provided by the file storage system of FIG. 1a.

DETAILED DESCRIPTION

Figure 1A:
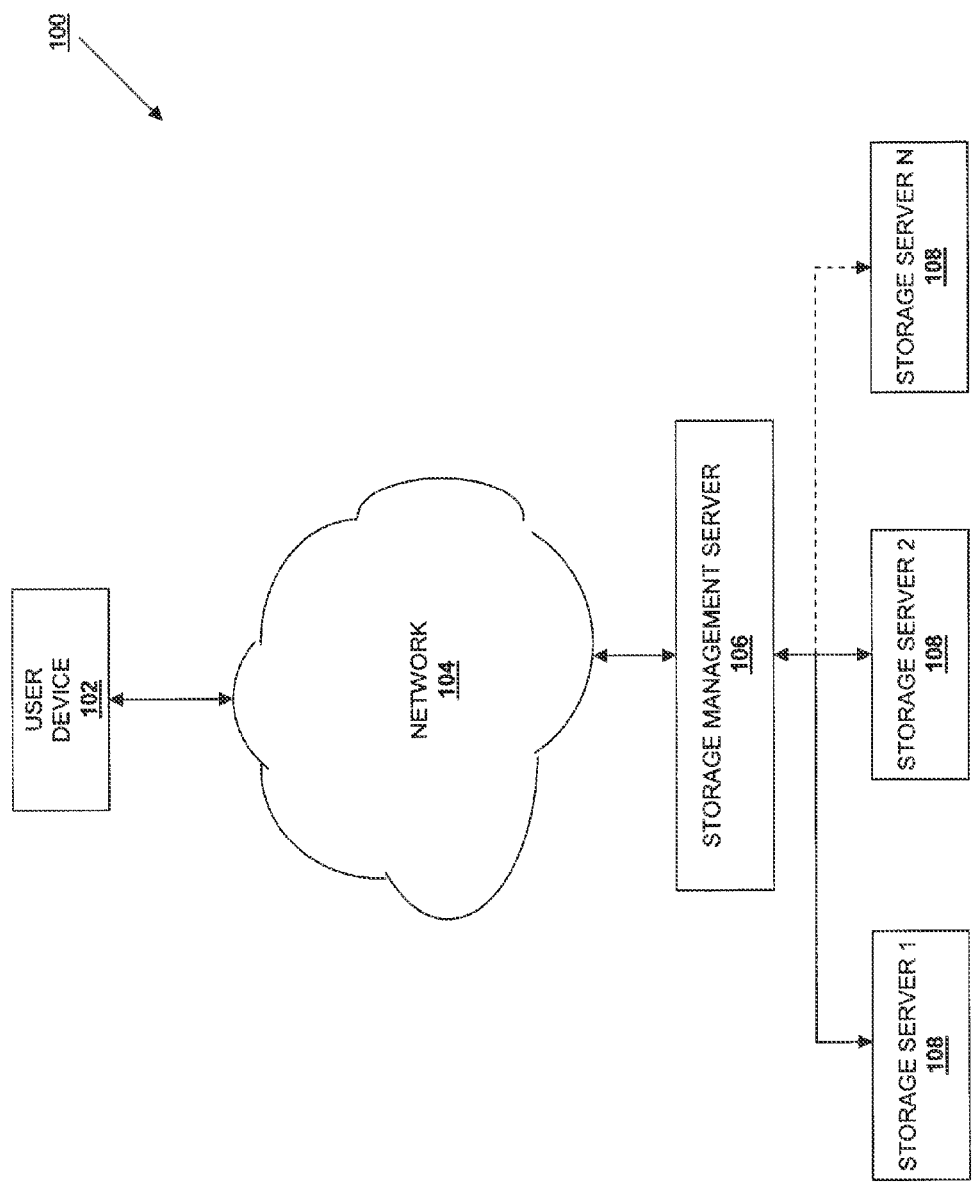
FIG. 1a is a schematic view illustrating an embodiment of a file storage system.

Referring now to FIG. 1a, an embodiment of a file storage system 100 is illustrated. The file storage system 100 includes a user device 102 connected to a network 104 such as, for example, a Transport Control Protocol/Internet Protocol (TCP/IP) network (e.g., the Internet.) A storage management server 106 is connected to the network 104 and to a plurality of storage servers 108. While only one user device has been illustrated as connected to the network 104 for clarity of discussion, one of skill in the art will recognize that a plurality of user devices may, and typically will, be connected to the network 104. While only one storage management server coupled to a plurality of storage servers has been illustrated as connected to the network 104 for clarity of discussion, one of skill in the art will recognize that a plurality of storage management servers, each connected to a plurality of storage servers may, and typically will, be connected to the network 104. Each of the user device 102 and the storage management server 106 includes a respective network interface for communicating with the network 104 (e.g., outputting information to, and receiving information from, the network 104).

Each of the user device 102, storage management server 106, and the plurality of storage servers 108 may include a respective information processing system, a subsystem, or a part of a subsystem for executing processes and performing operations (e.g., processing or communicating information). An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems know in the art.

Figure 1B:
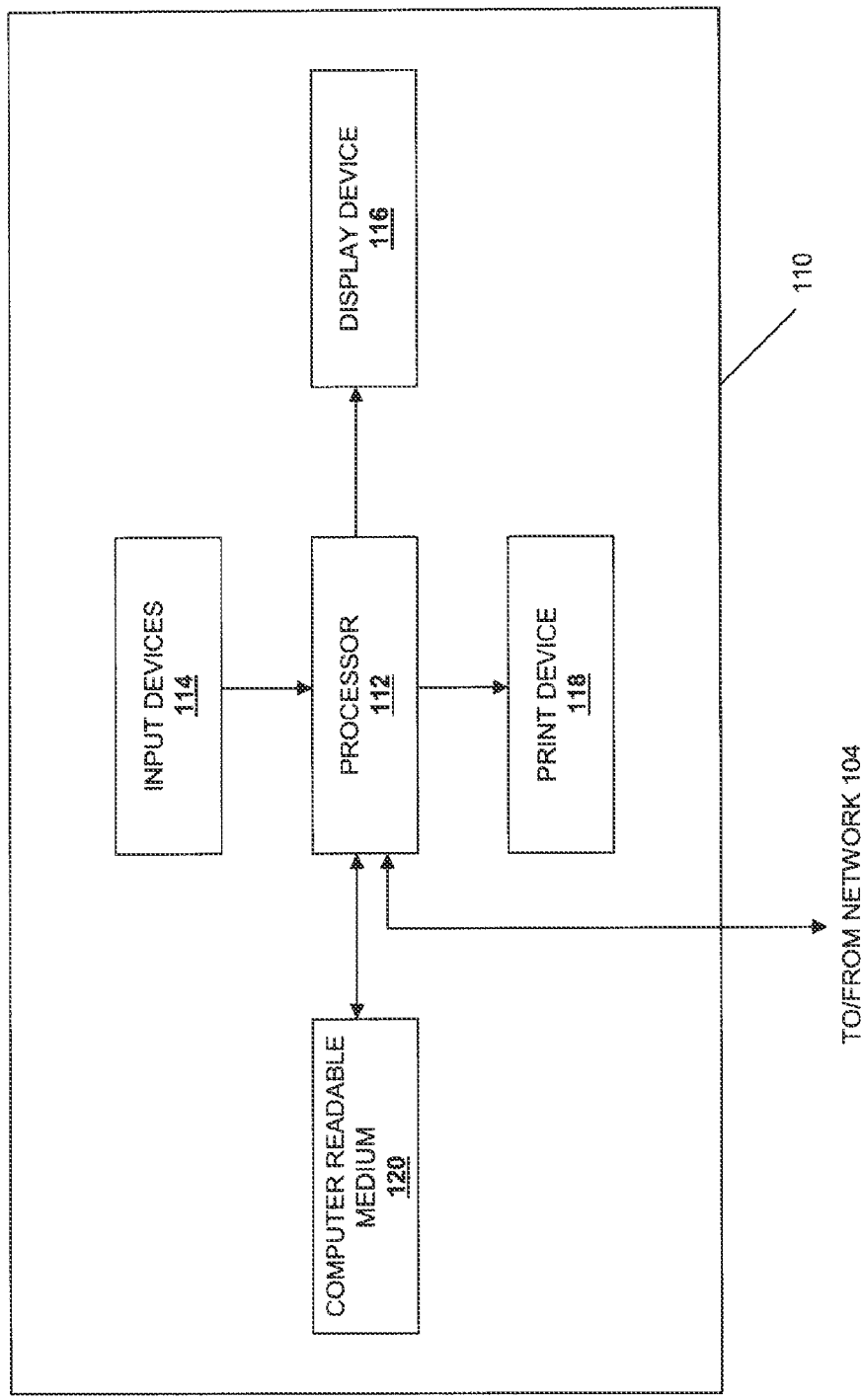

Referring now to FIG. 1b, an information processing system 110 which is representative of one of, or a portion of, the information processing systems described above, is illustrated. The information processing system 110 may include any or all of the following: (a) a processor 112 for executing and otherwise processing instructions, (b) a plurality of input devices 116, which are operably coupled to the processor 112, for inputting information, (c) an optional display device 116, which is operably coupled to the processor 112, for displaying information, (d) an optional print device 118, which is operably coupled to the processor 112, for printing visual images, scanning visual images, and/or faxing visual images, (e) a computer-readable medium 120, which is operably coupled to the processor 114, for storing information, as discussed further below, and (f) various other electronic circuitry for performing other operations of the information processing system 110 known in the art. For example, the information processing system 110 may include (a) a network interface (e.g., circuitry) for communicating between the processor 110 and the network 104 and/or other devices, and (b) a memory device (e.g., FLASH memory, a random access memory (RAM) device or a read-only memory (ROM) device for storing information (e.g., instructions executed by processor 112 and data operated upon by processor 112 in response to such instructions)).

The computer-readable medium 120 and the processor 110 are structurally and functionally interrelated with one another as described below in further detail, and information processing system of the illustrative embodiment is structurally and functionally interrelated with a respective computer-readable medium similar to the manner in which the processor 110 is structurally and functionally interrelated with the computer-readable medium 120. As discussed above, the computer-readable medium 120 may include a hard disk drive, a memory device, and/or a variety of other computer-readable media known in the art, and when including functional descriptive material, data structures are created that define structural and functional interrelationships between such data structures and the computer-readable medium 120 (and other aspects of the system 100). Such interrelationships permit the data structures' functionality to be realized. For example, the processor 112 reads (e.g., accesses or copies) such functional descriptive material from the computer-readable medium 120 onto the memory device of the information processing system 110, and the information processing system 110 (more particularly, the processor 112) performs its operations, as described elsewhere herein, in response to such material stored in the memory device of the information processing system 110. In addition to reading such functional descriptive material from the computer-readable medium 120, the processor 112 is capable of reading such functional descriptive material from (or through) the network 104. In one embodiment, the computer-readable medium is non-transitory.

Figure 2:
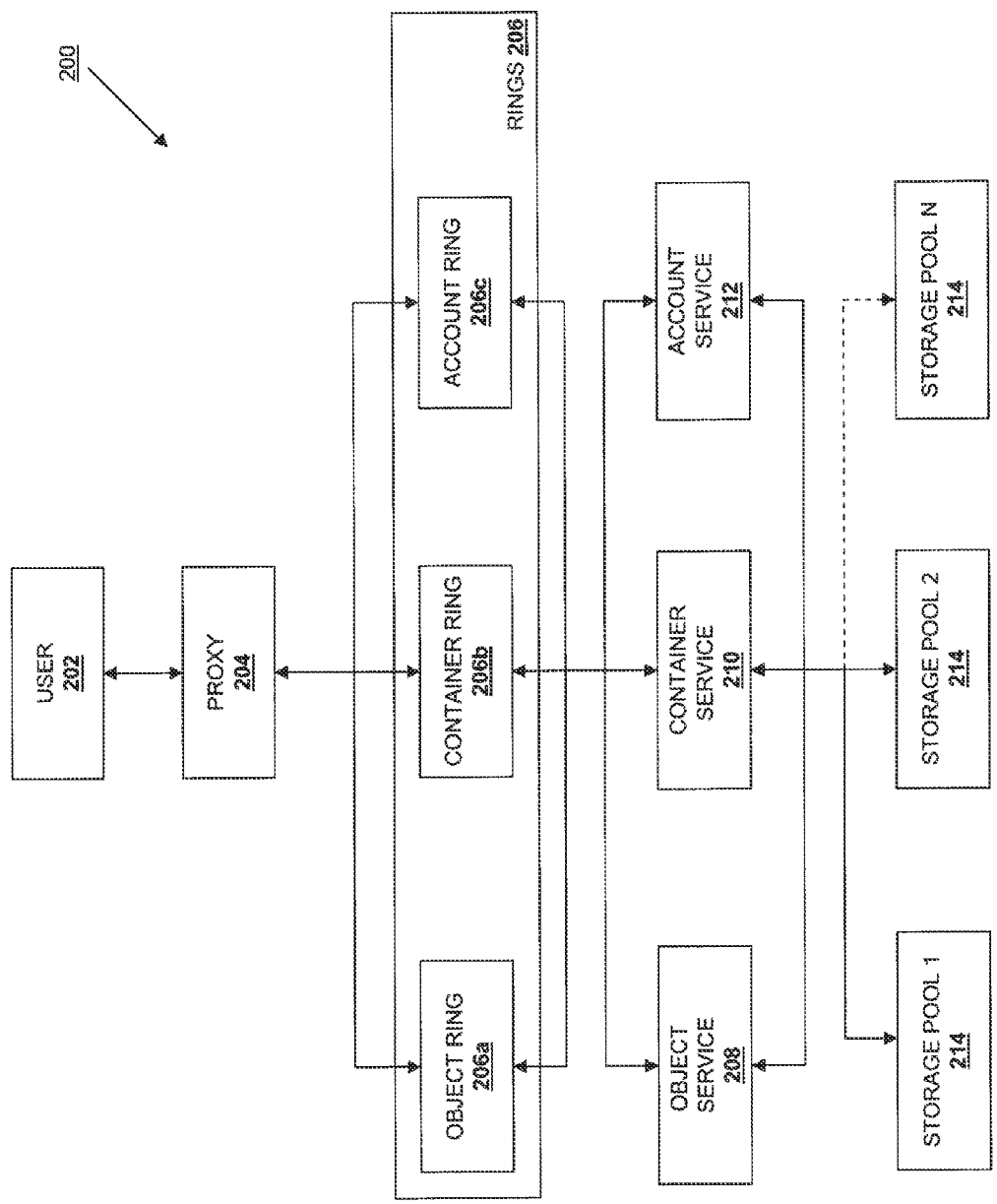

Referring now to FIGS. 1a and 2, the file storage system of FIGS. 1a and 1b creates a logical structure 200. The logical structure 200 includes a user 202 connected to a proxy 204. In one embodiment, the user 202 may be provided by the user device 102, the proxy 204 may be provided by the storage management server 106, and the user 202/proxy 204 connection may be created by the coupling of the user device 102 to the storage management server 106 through the network 104. The proxy 204 is connected to one or more rings 206 such as an object ring 206a, a container ring 206b, and an account ring 206c, described in further detail below, that are connected to an object service 208, container service 210, and an account service 212, respectively, described in further detail below. In other embodiments, there are other types of objects managed by rings, such as a structured data ring, a graph storage ring, or another type of ring (not pictured). In such embodiments, each ring would be connected to an appropriate service, such as a structured data service, a graph service, or another service (not pictured).

Each of object service 208, the container service 210, and the account service 212 are connected to a plurality of storage pools 214. In one embodiment, the rings 206 may include software that is stored on a computer-readable medium location in the storage management server 106 and/or the storage servers 108. In one embodiment, the object service 208, the container service 210, and the account service 212 may include software that is stored on a computer-readable medium located in the storage management server 106 and/or the storage servers 108. In one embodiment, the storage pools 208 may be provided by the storage servers 108. In one embodiment, the proxy 204/rings 206/object service 208/container service 210/account service 212/storage pool 214 connections may be created by the connection of the storage management server 106 with the storage servers 108. In a further embodiment, the rings are implemented at least in part using electrical circuits on a semiconductor chip to achieve better speed and latency.

In one embodiment, each storage pool 214 is provided by a separate storage server 108 or includes a virtual server that is included in a portion of one of the storage servers 108 or across a plurality of the storage servers 108. For example, the storage servers 108 may be physically located in one or more data centers, and the resources of the storage servers 108 may be virtualized according to the requirements of a plurality of users (e.g., the user 202) such that the plurality of storage pools 214 are provided to the plurality of users in order to store files and/or data objects. Thus, resources for a particular virtual server or storage pool may span across multiple storage servers 108.

Figure 3:
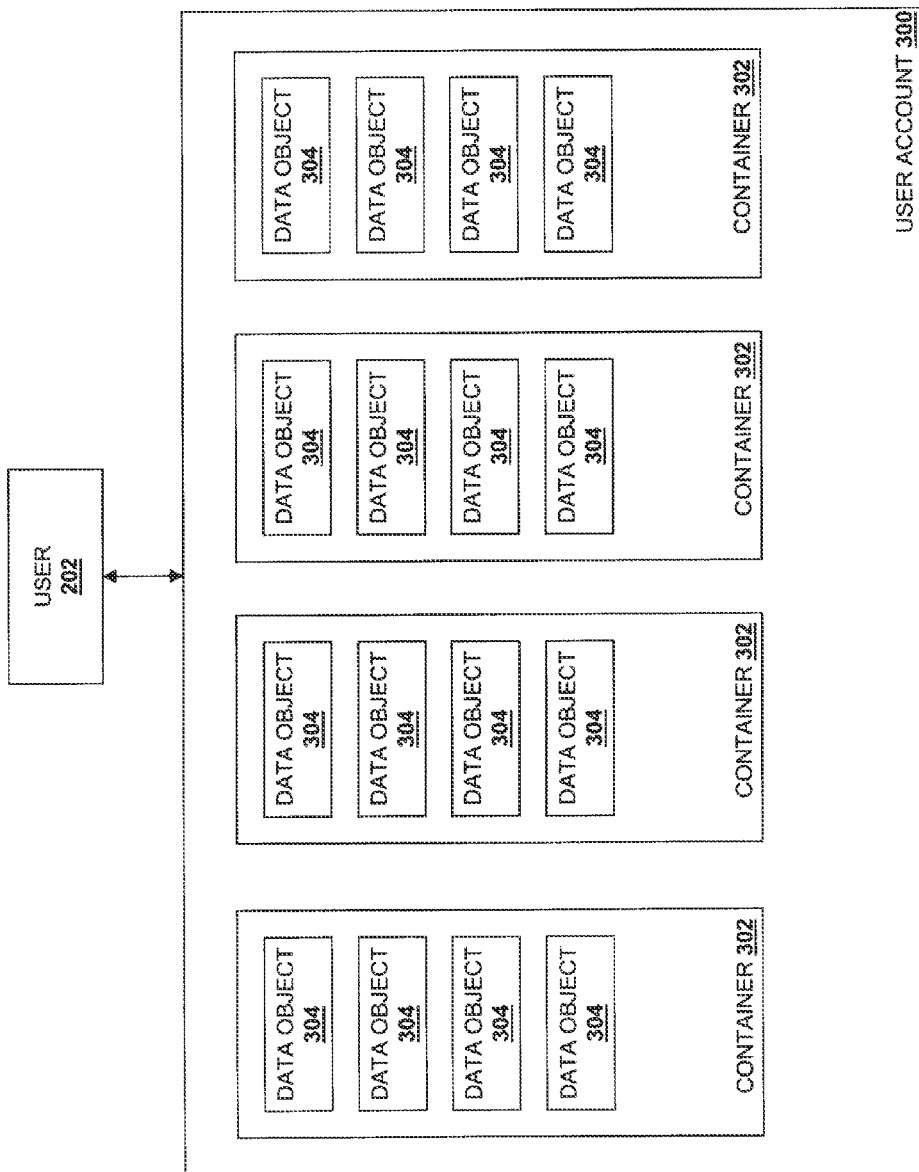
FIG. 3 is a schematic view illustrating an embodiment of a user account.

Referring now to FIG. 3, the user 202, which is exemplary of a plurality of users that use the file storage system 100, has a user account 300 with the file storage system 100 to store and receive data objects, and that user 202 may create a plurality of containers 302 in the user account 300 and store a plurality of data objects 304 in each of the containers 302 for retrieval. In the discussion below, a user account is referred to as an "account", a container is referred to as a "container", and a data object us referred to as an "object" for clarity of discussion. One of skill in the art will recognize that the terms "account", "container" and "object" are generic forms of data naming that are used to direct the file storage system 100 to a specific data object. When other types of rings and services are used, an appropriate name may be substituted. For clarity, discussion of alternative rings and services will be limited to the "account", "container" and "object" rings and services.

The components of the file storage system 100 and some of their functions will now be described in detail.

The Rings 206

As discussed above, the rings 206 are implemented in a tailored electrical circuit or as software instructions to be used in conjunction with a processor to create a hardware-software combination that implements the specific functionality described herein. To the extent that software is used to implement the rings, it may include software that is stored on a computer-readable medium location in the storage management server 106 and/or the storage servers 108. Referring back to FIG. 2, the rings 206 include semiconductor circuits and/or computer-executable instructions that, when executed by a processor, provide subsystems of the file storage system 100 that provide a mapping between the entities stored in the file storage system 100 and the locations of those entities in the storage pools 214. In the illustrated embodiment, the file storage system 100 includes a separate object ring 206a, container ring 206b, and account ring 206c, and when components of the file storage system 100 need to perform any operation on an object, container, or account, those components interact with the object ring 206a, container ring 206b, and account ring 206c, respectively, to determine the location of that stored entity in the storage pools 214. However, one of skill in the art will recognize that different ring structures may be provided (e.g., a single ring for the objects, containers, and accounts, more than one ring for each of the objects, containers, and account, etc.) without departing from the scope of the present disclosure. The rings 206 maintains the availability and safety of data in the file storage system 100 through the use of zones, partitions, replicas, and the storage pools 214, as described below.

A zone is defined as one or more of the storage pools 214 that are subject to a correlated loss of access or data as a result of a particular event. For example, each storage server 108 in the file storage system 100 may be defined as a storage pool in a separate zone, as each storage server 108 is subject to loss of access to its stored objects as a result of a storage device failure, a catastrophic event at the location where the storage server resides, and/or a variety of other object access-loss scenarios known in the art. For the same reasons, a drive in a storage server 108 may be defined as a storage pool in a separate zone, a plurality of storage servers 108 in a given storage rack or cabinet as a storage pool in a separate zone, a plurality of storage servers 108 coupled to the same switch as a storage pool in a separate zone, a plurality of storage servers 108 in a given datacenter as a storage pool in a separate zone, a plurality of storage servers 108 connected to a common power system as a storage pool in a separate zone, etc. One of skill in the art will recognize that the examples of zones provided above are not limiting, and a variety of zones known in the art will fall into the scope of the present disclosure.

Logically, a partition is an abstract storage bucket. As discussed in further detail below, the file storage system 100 maps each partition to a plurality of storage pools 214 that are in different zones, and stores data using those partitions. The mapping of a given partition to a plurality of storage pools 214 creates a plurality of partition replicas of that partition (e.g., equal to the number of storage pools 214 the partition is mapped to.) For example, when a given partition is mapped to 3 storage pools 214 that are in different zones, 3 partition replicas of that partition are created.

The object ring 206a for the management of objects will be described in detail below. However, one of skill in the art will recognize how the discussion may be applied to the container ring 206b, the account ring 206c, and/or a ring for any other stored entity, without departing from the scope of the present disclosure.

In various replicated, network-based file storage systems, an object from a user is received by a proxy. To determine where the object should be stored, some attribute of the object or the object data itself is hashed. If necessary, some attribute of the object is modified so that three different results are returned from the hashing function. The object is then replicated and stored in the storage pool corresponding to the number returned by the hash function.

Under typical circumstances, a consistent hashing function is used as the hash function. The use of the consistent hashing function ensures that there will be minimal changes to the assigned storage pools given a change in membership due to adding or removing new storage pools.

Although the consistent hashing function results in minimal changes to the storage location, sometimes the assignments made by the consistent hashing function or the rearrangements needed due to a change in membership may have undesirable storage characteristics. For example, such methods have been found to result in multiple object replicas for the same object being stored in one or more storage pools that are in the same zone. As discussed above, this is undesirable because then multiple (and possibly all) object replicas for the same object are subject to being lost as a result of a particular event. Alternatively, rebalancing the replicas due to a change in membership has been found to require the movement to two of the replicas 4% of the time, and the movement of all three replicas 1% of the time. It is desirable to never have to move more than one replica at a time.

Figure 4:
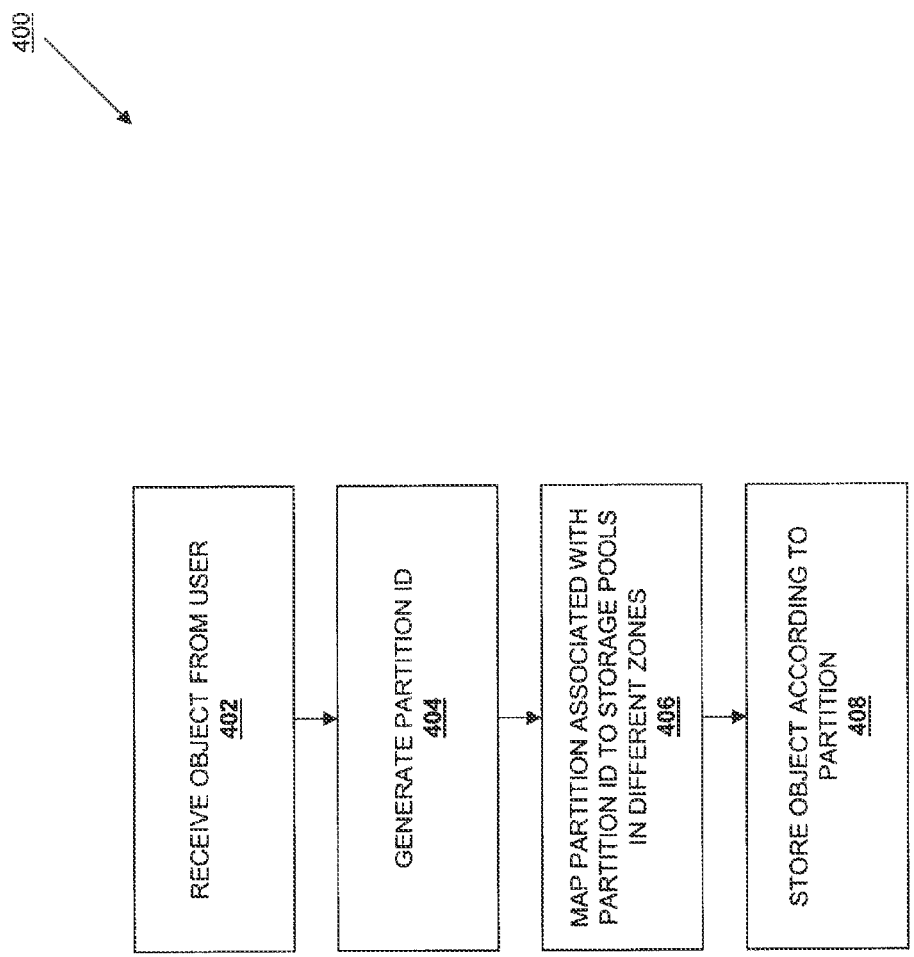
FIG. 4 is a flow chart illustrating an embodiment of a method for storing an object.

In one embodiment, the file storage system 100 solves the problem of multiple object replicas for the same object being stored in storage pools that are in the same zone through the use of the rings 206. Referring now to FIG. 4, a method 400 for storing stored entities is illustrated. At block 402, an object us received by a user. In one embodiment, an object is received from the user 202 by the proxy 204. The method 400 then proceeds to block 404 where a partition identification is generated. In one embodiment, a consistent hash function is applied to the object received in block 402, and the hash function returns a partition identification that corresponds to a partition. The method 400 then proceeds to block 406 where the partition associated with the partition identification is mapped to storage pools that are in different zones. This mapping function is constrained so that the physical location of the storage pools is required to have one or more desirable properties, such as having each partition replica in a separate zone.

There are various embodiments of the constrained mapping function. In one embodiment, the constrained mapping function is the output of a constraint satisfaction solver, in which the desired storage characteristics (such as the requirement that each replica of a partition be in a different availability zone) are inputs to the solving function. The solver then uses one or more search methodologies within the solution space to find a storage layout that maps partitions to storage pools in a desirable manner.

In a second embodiment, a constrained mapping function is applied to portions of the partition identification (e.g., the portions of the partition identification that the constrained mapping function is applied to) may be bits of the output of the original hashing function is applied to the object. For example, the number of bits to which the constrained mapping function is applied may be known as the partition power, and 2 to the partition power may indicate the partition count. The constrained mapping function is designed to return a storage pool location for each portion of the partition identification to which it is applied, and the storage pool locations returned for a given partition identification will each correspond to storage pools 214 in different zones. These storage pool locations are then associated with the partition identification. Thus, the partition corresponding to the partition identification is replicated multiple times in the file storage system 100 (i.e., a partition replica is included in each storage pool corresponding to the storage pool locations determined from the constrained mapping function.) The method 400 then proceeds to block 408 where the object is stored according to the partition. The object received by the user 202 in block 402 of the method 400 may then be stored according to the partition corresponding to the partition identification, which results in multiple object replicas for the object being stored in storage pools that are in different zones in the file storage system 100. In another embodiment, the constrained mapping function is used to determined storage pool locations that are in different zones for each partition prior to the object being received by the user 202, discussed in further detail below.

The output of the constrained mapping function signifies a particular storage pool where a replica of the partition should be stored. An example of this output is as follows: When an object is received from the user 202 at block 402 of the method 400, and at block 404 of the method 400, a hash function is applied to the object. In one exemplary embodiment, the user 202 provides data including an account/container/object name to the proxy 2004, and a hash function is applied to the account/container/object name as follows:

Hash function (account/container/object name)==123456789 Where 123456789 is the partition identification that is returned by the hash function. At block 406 of the method 400, the partition mapping number may then be divided into 3 parts (e.g., the first three digits, the second three digits, and the third three digits of the partition identification,) and the constrained mapping function is applied to each of those parts: Constrained mapping function (123)==storage pool location (zone 1) Constrained mapping function (456)==storage pool location (zone 7) Constrained mapping function (789)==storage pool location (zone 3) As discussed above, the constrained mapping function is designed to return the storage pool location (zone 1), storage pool location (zone 7), and storage pool location (zone 3) that correspond to storage pools that are in different zones (e.g., zones 1, 3, and 7). The storage pools locations are then associated with the partition identification: Partition identification: (storage pool location (zone 1)), storage pool location (zone 7), storage pool location (zone 3)) Thus, the partition corresponding to the partition identification is replicated across storage pools that are in different zones (here, zones 1, 3, and 7.) At block 408 of the method 400, the object received from the user 202 is then stored, using the partition corresponding to the partition identification, in each of the storage pools corresponding to the storage pool locations returned by the application of the constrained mapping function to portions of the partition identification. Thus, 3 replicas of the object received from the user 202 are stored in the file storage system 100 in storage pools that are located in different zones (zones 1, 3, and 7.) In one embodiment, each of the storage pool locations are IP addresses, i.e., when each of the storage pools are separate storage servers. In one embodiment, the constrained mapping function is a hash function. However, one of skill in the art will recognize that a variety of functions may be used to ensure that each partition is mapped to storage pools that are in different zones without departing from the scope of the present disclosure.

In another embodiment, the constrained mapping function is applied to the file storage system 100 before the object is received by the user 202 at block 402 in order to accomplish the mapping of the partitions to storage pools described above with reference to block 406 of the method 400. For example, the total number of partitions and the total number of storage servers/storage pools in the file storage system 100 may (and typically will) be known. With that knowledge, the constrained mapping function is used to map each partition in the file storage system 100 to a plurality of storage pools that are in different zones, and that information is stored in a constrained mapping database. For example, a constrained mapping database may include partitions mapped to storage pools such as:
Partition 1: (storage pool location (zone 1)), storage pool location (zone 2), storage pool location (zone 3)) Partition 2: (storage pool location (zone 4)), storage pool location (zone 5), storage pool location (zone 6)) Partition 3: (storage pool location (zone 7)), storage pool location (zone 8), storage pool location (zone 9)) In one embodiment, the output of the constrained mapping function can be saved for optimized lookup. For example, the saved output may be embodied in a file provided to each of the storage pools 214, or stored in a database that is available for the appropriate systems to query. If the saved output is contained within a file, the storage pools 214 may then periodically check the modification time of this file and reload their in-memory copies of the ring structure as needed.

Thus, when an object is received from a user 202 at block 402, the hash function is applied to that object to get the partition identification (e.g., partition 1, 2, or 3 in the example above) at block 404, and then at block 406, the partition identification may then be used with the constrained mapping database to determine the corresponding partition and its associated storage pool locations. This embodiment allows the processing necessary to map partitions to multiple storage pools in different zones to be conducted before objects are received from users so that such processing does not have to be conducted each time an object is received from a user.

Figure 5:
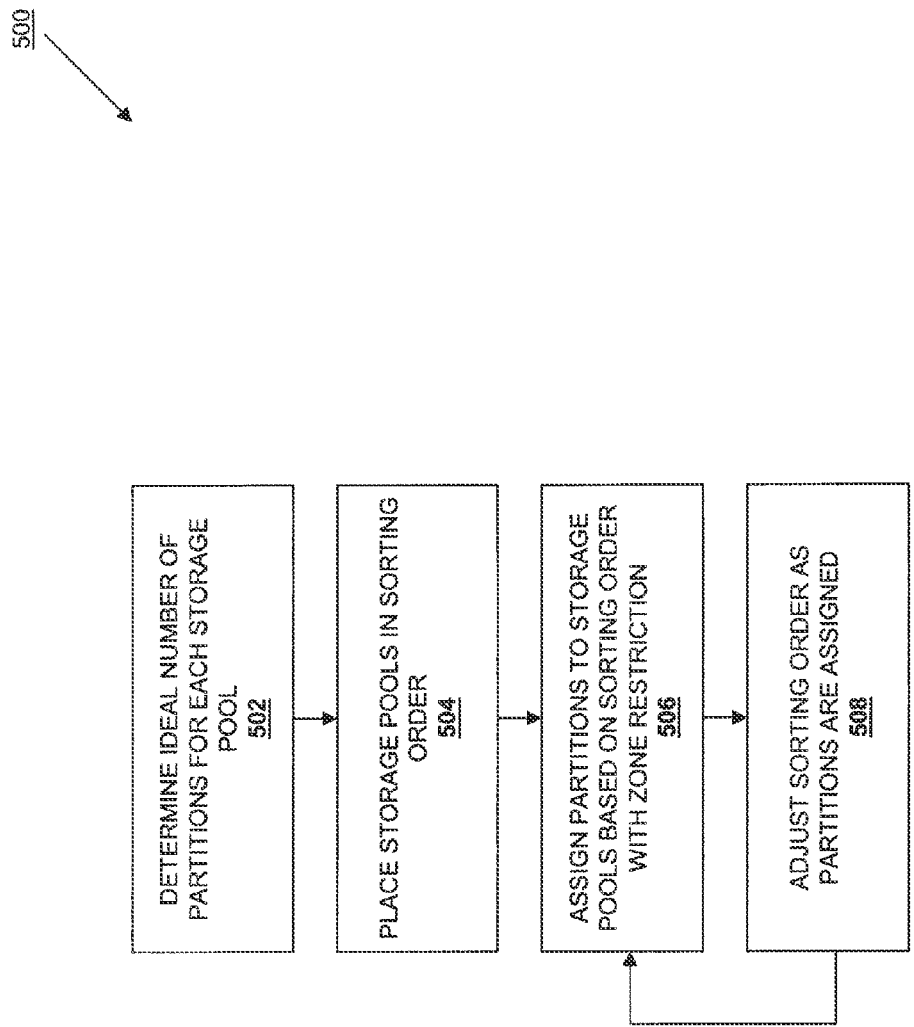
FIG. 5 is a flow chart illustrating an embodiment of a method for creating a ring.

For example, referring now to FIG. 5, a method for building a ring 206 is illustrated. At block 502, an ideal number of partitions for each storage pool in the file storage system is determined. In one embodiment, the number of partitions that should ideally be assigned to each storage pool 214 is calculated based the weight (e.g., storage capacity) of each storage pool 214. For example, if the partition power is 20, the ring 206 will have 1,048,576 (2.sup.20) partitions. If there are 1,000 storage pools 214 of equal weight, each storage pool 214 will ideally be assigned 1,048.576 partitions. This may be referred to as an ideal partition count, and in the example, each storage pool 214 starts off empty with a 1,048.576 ideal partition count. The method 500 then proceeds to block 504 where the storage pools are placed in a sorting order. In one embodiment, the storage pools 214 are placed in a sorting order based on their ideal partition count (e.g., highest to lowest), and this sorting order is maintained throughout the method 500 as partitions are assigned storage pools 214. The method 500 then proceeds to block 506 where partitions are assigned to storage pools based on their sorting order but with a zone restriction. In one embodiment, the partitions are assigned to the storage pool 214 with the highest ideal partition count, but subject to the restriction that the storage pool 214 to which a partition is being assigned is not in the same zone as any other storage pool 214 that includes a partition replica for that same partition. The method 500 then proceeds to block 508 where the sorting order of the storage pools is adjusted. In one embodiment, once a partition is assigned to a storage pool 214, that storage pool 214 will have its ideal partition count decremented and thus that storage pool 214 is moved to a lower position in the sorting order, and the method 500 then returns to block 506 to continue to assign partitions to storage pools based on their sorting order but with the zone restriction. In such a manner, each partition is assigned multiple storage pools 214 in different zones, and thus objects received from users may have multiple object replicas stored in storage pools in different zones simply by associating those objects with the partitions.

As mentioned above, another problem relates to the rebalancing of object replicas stored in the file storage system due to changing membership (i.e., adding or subtracting storage servers or storage pools from the file storage system.) Such methods have been found to require the moving of multiple object replicas of the same object in response to a membership change, which is undesirable.

In one embodiment, the mapping of partitions to multiple storage pools in different zones in the file storage system 100 described above solves these problems. The use of the constrained mapping function to ensure that each partition is mapped to storage pools in different zones ensures that object replicas for the same object are never located in storage pools 214 that are in the same zone (i.e., because any given object received from a user is stored in a partition that is replicated in storage pools that are in different zones.) For example, with each storage server 108 defined as a separate zone, the addition or subtraction of a given storage server 108 from the file storage system 100 thus can only effect one partition replica, and hence one object replica of a given object (i.e., because only one of the partition replica will ever be located on a storage server that is defined as a separate zone.) In similar fashion, the rebalancing associated with changing the zone membership can be accomplished without affecting more than one replica because each zone is guaranteed to only contain one replica of a given partition.

Figure 6:
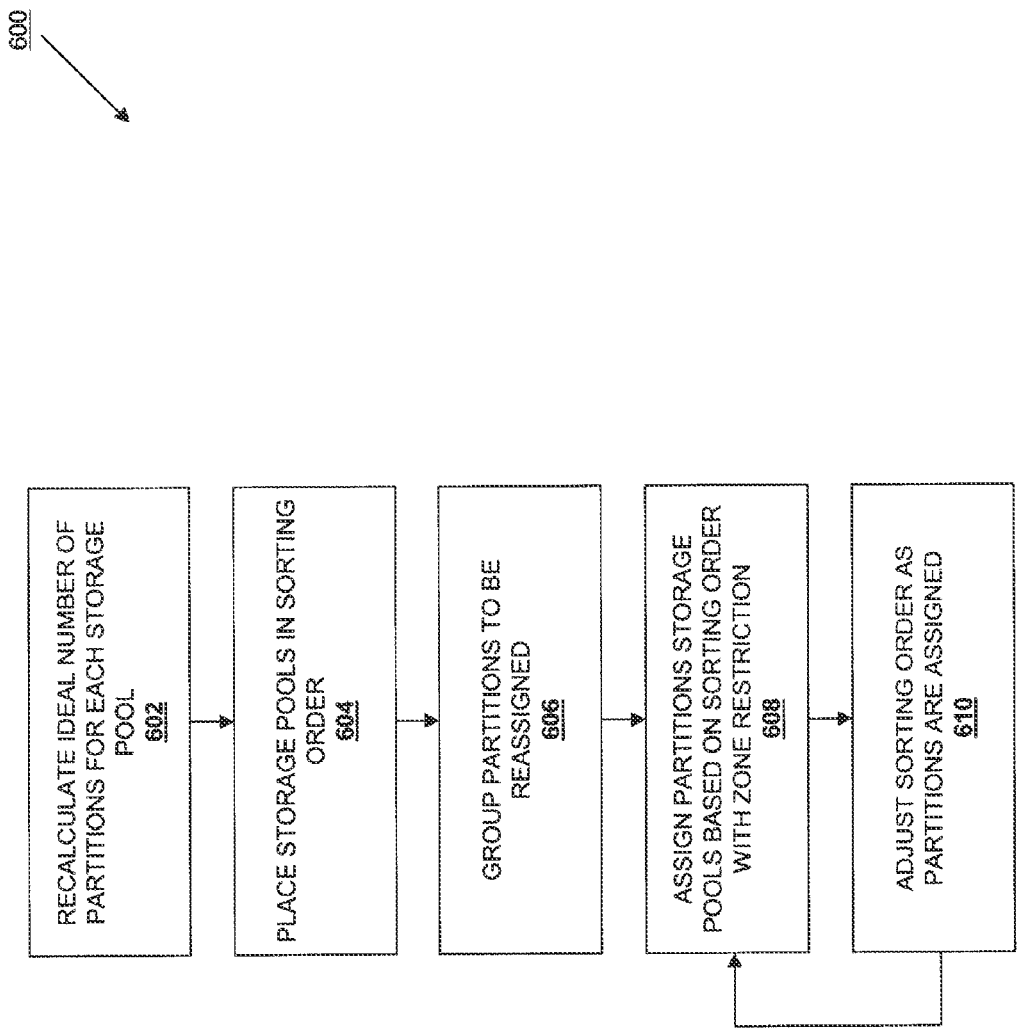
FIG. 6 flow chart illustrating an embodiment of a method for reassigning partitions in a ring.

Periodically, partitions may need to be reassigned to different storage pools 214, and the reassignment of partitions will result in the building of a new ring from an old ring. Such an event may occur due to the removal and/or addition of a storage pool 214 from the file storage system 100 (e.g., a membership change.) Referring now to FIG. 6, a method 600 for reassigning partitions in response to the removal of a storage pool is illustrated. The method 600 begins at block 602 where the ideal number of partitions for each storage pool is recalculated. In one embodiment, the ideal partition count for the storage pools 214 remaining in the file storage system 100 (subsequent to the removal of a storage pool) are recalculated. The method 600 then proceeds to block 604 where the storage pools are placed in a sorting order as described above with reference to block 504 of the method 500. The method then proceeds to block 606 where partitions to be reassigned are grouped. In one embodiment, a partition list for the partitions to be reassigned is created. For example, any storage pools 214 that have been removed from the file system 100 may have all their assigned partitions unassigned and added to the partition list, and any storage pools 214 that have more partitions than their ideal partition count may have random partitions unassigned from them and added to the partition list (i.e., such that those storage pools have a number of partitions that is within a predetermined amount of their ideal partition count.) The partitions on the partition list may then be reassigned to the storage pool 214 in blocks 608 and 610 of the method 600 substantially as discussed above with reference to blocks 506 and 508 of the method 500. In one embodiment, at block 608 of the method 600, whenever a partition is reassigned to a storage pool 214, the time of the reassignment is recorded. Reassignment times may be used when gathering partitions to reassign to storage pools 214, such that no partition replica for a given partition is moved twice in a predetermined amount of time. However, such reassignment restrictions based on reassignment times may be ignored for partition replicas on storage pools 214 that have been removed from the file storage system 100, as removing a storage pool 214 only happens upon storage pool 214/storage server 108 failure and thus requires the reassignment of the partitions.

In one embodiment, the method 600 is conducted periodically to help balance the amount of data stored by storage pools 214 in the file storage system 100. For example, the partition reassignment method 600 discussed above may repeated until each storage pool 214 is within a predetermined threshold of a predetermined storage capacity (e.g., within 1% of 60% storage capacity for that storage pool) or when it is determined that partition reassignment will not improve the balance of data stored by the file storage system 100 by more than a predetermined amount. For example, if a first storage server 108 includes 2 TB of storage, a second storage server 108 includes 4 TB of storage, and a third storage server 108 includes 6 TB of storage, data balancing may be conducted to ensure that each of the storage servers 108 holds the same percentage of its storage capacity (i.e., the first storage server 108 holds 0.66 TB of data, the second storage server 108 holds 1.33 TB of data, and the third storage server 108 holds 2 TB of data such that each of the storage servers 108 is at 33% of its storage capacity.) Weights may be applied to storage servers 108 to balance the distribution of data on the storage servers 108 in the file storage system 100 to account for different storage capacities.

Object Service 208

As discussed above, the object service 208 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108. The object service 208 may include instructions that, when executed by a processor, provide object storage and objection manipulation functionality such that the object service 208 is operable to, for example, store, retrieve and delete stored objects in the storage pools 214. In one embodiment, a object service 208 is provided for each storage pool that holds object data. For example, an object service 208 may be included on a server that further includes one or more storage drives that provide a storage pool for objects. In one embodiment, the objects are stored as binary files with metadata stored as extended attributes of the file in the file system used by the object storage service. In such an embodiment, the object service 208 will uses the extended attributes of the filesystem to manage the metadata. In a second embodiment, the metadata is stored in a machine-readable format next to the data itself. For example, the metadata for a file is stored in a text file or single file database.

In one embodiment, objects are stored by the object service 208 using a path derived by applying a hash function to the name of the object along with a timestamp. For example, an incoming object for a user account to be written to a container will have a hash applied to its account/container/object name and the path generated for the object is:
/objects/<partition>/<storage pool location>/objectname_hash.15673.data where "objects" indicate that the object data is stored in an object storage pool 214, <partition> is the partition identification that maps the object to a partition, <storage pool location> is the storage pool location that maps the partition replica to a storage pool 214 in a different zone than its related partition replicas, objectname_hash is the hash of the account/container/object name, and 15672 is the timestamp.

When there is a request for an object, the file storage system 100 will find all the object replicas in the file storage system 100 that include the objectname_hash and return the object data that has the most recent timestamp value. Special care is needed to record updates that should be persisted as the new canonical value. For example, when an object replica is deleted, a modification sentinel (e.g., a 0 byte "tombstone" file or ".ts" file) is written to the storage pool 214 where the deleted object replica was located and that includes the same objectname_hash as the deleted object replica (i.e., /objectname_hash.15784.ts,) and that tombstone file stays in the file storage system 100 for a predetermined amount of time (e.g., 7 days.) During object replication, discussed in further detail below, when the file storage system 100 encounters a tombstone file, the file storage system 100 checks whether the tombstone file has been in the system for 7 days. If not, the file storage system 100 searches for and deletes any object replicas that it finds related to that tombstone file (e.g., replicas that same objectname_hash as the tombstone file) to ensure that objects that were meant to be deleted from the file storage system 100 are removed and older versions of object replicas of a given object do not appear in the file storage system 100 due to, for example, the temporary failure of a storage server 108 or storage pool 214 that might have prevented the deletion of that object replica previously. If the file storage system 100 determines that a tombstone file has been in the file storage system 100 for longer than the predetermined time, that tombstone file is deleted.

The mechanism used for recording file deletion is also used to record other types of updates. For example, a "purge" marker indicates that the system should overwrite all copies of the object and set the space to free; a "version" marker indicates that the system should create a copy and mark the copy with a version number; and a "ttl" (time-to-live) marker indicates that the system should check an authoritative source for updates after the expiry of a set time period. Other types of out-of-band changes to the file are also contemplated.

Container Service 210

As discussed above, the container service 210 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108. The container service 210 may include instructions that, when executed by a processor, provide container storage and container manipulation functionality such that the container service 210 is operable to store, retrieve and delete stored containers in the storage pools 214. In one embodiment, an container service 210 is provided for each storage pool that holds container data. For example, a container service 210 may be included on a server that further includes one or more storage drives that provide a storage pool for containers, and the container service 210 may include the names of containers and objects in those containers. Thus, In one embodiment, the container service 210 handles the listing of containers, and does not hold the location where the objects are stored (e.g., the storage pool where a given object replica resides), but rather the locations of containers that hold the objects. The listings for the container locations may be stored as database files, and those listings may be replicated across the storage pools 214 in a manner that is similar to the replication of objects (i.e., through their association with partitions,) discussed above. Container storage statistics for the container service(s) 210 may be tracked by the file storage system 100 and may include total number of objects stored by one or more containers, the total storage provided by any given container, and/or a variety of other statistics known in the art.

Account Service 212

As discussed above, the account service 212 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108. The account service 212 may include instructions that, when executed by a processor, provide account storage and account manipulation functionality such that the account service 212 is operable to store, retrieve and delete stored accounts in the storage pools 214. In one embodiment, an account service 212 is provided for each storage pool that holds account data. For example, a account service 212 may be implemented by a server that includes storage drives that provide a storage pool for accounts, and the account service 212 may include the names of accounts and containers in those accounts. Thus, the account service 212 is very similar to the container service 210, discussed above, with the exception that account storage 212 handles the listings of accounts.

Other Services

As discussed above, other types of services may be implemented in similar fashion to the object, container, and account services described above. For example, one implementation includes an authorization service. The authorization service may include instructions that, when executed by a processor, handle the storage and manipulation of authorization metadata so that the authorization service is operable to store, retrieve, delete, and query stored credentials from in the storage pools 214. In one embodiment, an authorization service provides an ACL-based authorization. In a second embodiment, the authorization service provides posix-compatible authorization. In a third embodiment, the authorization service provides tree or graph-based authorization, such as would be provided with an LDAP-based authorization service.

A second implementation includes a structured data service. The structured data service may include instructions that, when executed by a processor, provide handle the storage and manipulation of structured data such that the structured data service is operable to store, retrieve, delete, and query tabular, graph, or tree-based data from in the storage pools 214. In one embodiment, an structured data service provides a JSON-based output. In a second embodiment, the structured data service provides XML-based output. In a third embodiment, the structured data service provides HTML output.

Proxy 204

The proxy 204 is implemented in a tailored electrical circuit or as software instructions to be used in conjunction with a processor to create a hardware-software combination that implements the specific functionality described herein. The proxy 204 is responsible for tying together the file storage system 100. For each request received from a user, the proxy 204 determines the location of the account, container, or object in the appropriate ring 206 (e.g., the object ring 206a, the container ring 206b, or the account ring 206c,) and routes the request accordingly. A public Application Programming Interface (API) may be exposed to users through the proxy 204. A large number of failures may be handled by the proxy 204. For example, if a storage server 108 and/or storage pool 214 is unavailable for a object PUT, the proxy 204 may use the rings 206 to determine an appropriate storage server 108 and/or storage pool 214 for that object and route the object there instead. In one embodiment, when objects are streamed to or from a storage server 108, they are streamed directly through the proxy 204 and proxy server 106 to or from the user 202 and/or user device 102, and are not spooled by the proxy 204 and the proxy server 106.

In another embodiment, there are multiple proxies associated with a file storage service. The existence of multiple proxies may be ascertainable from outside the file storage service, or it may be transparent. Different proxies may be used for different purposes. For example, in one embodiment different proxies are used for different types of files. In another embodiment, different proxies are used for different types of requests. In a third embodiment, an appropriate proxy is chosen to minimize latency, geographic, or network distance between the proxy and the system making the request.

In one embodiment, one of the functions performed by the proxy is time-stamping or logging all requests into the storage system. The timestamps on the incoming requests are stored as metadata and are used in part to determine the most recent version of a file.

In an embodiment with more than one proxy, it is possible for more than one request to come in within a short period of time. In that case, it is important to resolve any conflicts associated with multiple simultaneous accesses to the file storage system. In one embodiment, an algorithmic approach for ordering the actions of different independent actors is used, such as the use of a vector clock. In a second embodiment, an independent arbiter is used to resolve conflicts, using an implementation of the Paxos algorithm or the Byzantine Generals algorithm.

A third embodiment may also be used to simplify and increase the speed of the system by reducing the applicable error window and then algorithmically picking a "winner" in the case of multiple conflicting accesses within the error window. For example, an embodiment may use a time synchronization server and time synchronization code to reduce the clock skew between different computers in a pool, in a zone, or across zones to within a specified .epsilon., for example one millisecond or one microsecond. The applicable.epsilon. can be determined by analyzing the pattern of accesses over time, and it may be different for different accounts, different types of services, or at different times. In this case, the algorithmic complexity of absolutely ordering the actions across the cluster is traded for the operational complexity of handling time synchronization across the system.

Given the clock synchronization across the pools or zones within .epsilon., the previously-discussed timestamp will be sufficient to absolutely order the actions of other systems interacting with the file storage system if there are not multiple conflicting accesses to the same stored value within c. In that case, the timestamping is used to order the actions and pick the most recent version of any information or data.

If there are multiple conflicting accesses within .epsilon., then the system includes a synchronization rectifier that algorithmically breaks the tie and chooses a winner. In one embodiment, this is handled by asserting that the first copy to replicate (as further discussed below) wins. In a second embodiment, the inconsistency is handled by throwing an error for manual intervention. In a third embodiment, the inconsistency is handled by examining one or more additional types of metadata, such as latency to the originating user (given identical arrival times, the originating server with lower latency issued second), internal file modification or creation times, or an arbitrary ordering on an unrelated value. A fourth embodiment uses geolocation on the requesting IP address and allowing the request that is geographically closer to the timestamping gateway. A fifth embodiment detects the attempted simultaneous access and does not allow any write, instead returning an error in response to both requests. A sixth embodiment evaluates the requests to see if they can be merged and both accesses granted.

Replicators

Replicators are implemented in a tailored electrical circuit or as software instructions to be used in conjunction with a processor to create a hardware-software combination that implements the specific functionality described herein. To the extent that one embodiment includes computer-executable instructions, those instructions may be implemented as an software that is stored on a computer-readable medium located in the storage management server 106 and/or the storage servers 108, and may include instructions that, when executed by a processor, keep the file storage system 100 in a consistent state in the face of temporary error conditions like network outages, storage pool 214 failure, and/or storage server 108 failure. For example, an object replicator may be provided for each storage pool 214 (e.g., a storage server 108 that provides a storage pool) that holds object data. The replicators compare stored entities in their storage pool 214 with each replica of that stored entity in other storage pools 214 in the file storage system 100 to ensure that all related replicas contain the latest version of the stored entity. In one embodiment, object replicators may use a hash list to quickly compare subsections of partitions, while container replicators and account replicators may use a combination of hashes and shared storage account metadata. In one embodiment, replicator updates of stored entities are push based. For example, replicators may compare the replica stored entities in their storage pools 214 with related replica stored entities in other storage pools in the file storage system 100, and if the replicator determines there is a difference between the replicas (e.g., by applying an order independent check sum to the related replicas), the replicator may then push the data that related replica stored entities in other storage pools need in order to be up to date. In one embodiment, the pushed updates include rsyncing replicas to efficiently provide only the data needed by the out-of-date replica. Account and container replicators may either push missing data over HTTP or rsync whole database files in the event it is determined that a push update will be inefficient. The push-based updates discussed above results in replicas being updated generally only from "local" storage pools 214 to "remote" storage pools 214. In one embodiment, this provides a benefit as data in a storage pool 214 may not belong there (as in the case of handoffs and ring changes), and a replicator can't know what data exists elsewhere in the file storage system 100 that it should pull in. Thus, it's the duty of any replicator associated with a given a storage pool 214 that contains data to ensure that data gets to other storage pools where it belongs. As discussed above, replicators may also ensure that data is removed from the system by creating the tombstone files as the latest version of a replica when that replica is deleted, and then search out and removing all replicas related to that tombstone file from the file storage system 100.

Database Replicators

Database replicators are a type of replicator, discussed above, that operate on storage pools 214 that contain accounts or containers (i.e., there may be account replicators and container replicators.) To perform the replication discussed above, the first step that a database replicator may perform may be a low-cost hash comparison to find out whether or not two replicas (e.g., a replica on the database replicators local storage pool 214 and a related replica on a "remote" storage pool 214) already match. Under normal operation, the hash comparison allows relatively quick verification that databases in the file storage system 100 are already synchronized. If the hashes differ, the database replicator may bring the databases in sync by sharing records added since the most recent previous sync point. This most recent previous sync point notes the last record at which two databases were known to be in sync. After all new records have been pushed to the remote database, the sync table (which lists which remote databases a local database is in sync with) of the local database is pushed to the remote database, so the remote database knows it's now in sync with database that the local database has previously synchronized with. If a database replica (e.g., an account replica or container replica) is found to be missing entirely from a storage pool 214 that it should exist in, the entire local database file may be recreated on that storage pool 214 using rsync techniques known in the art. In one embodiment, when an entire local database file is be recreated on a storage pool 214 using rsync, that database may be vested with a new unique id.

Object Replicator

Object replicators are a type of replicator, discussed above, that operate on storage pools 214 that contain objects. In one embodiment, object replicators associated with a storage pool 214 may performed rsync techniques known in the art on remote storage pools to determine appropriate data to push data to remote storage pools. However, as object replication times may increase using this method when the file storage system 100 gets sufficiently large, a hash of the contents for each suffix directory may instead be saved to a per-partition hashes file, and the hash for a given suffix directory is then invalidated when the contents of that suffix directory are modified. The object replicator may then read these hash files, calculate any invalidated hashes, and transmit the hashes to each remote storage pool 214 that should hold the partition, and only suffix directories with differing hashes on the remote server are then rsynced. After pushing data to the remote storage pools 214, each rsynced suffix directory has its hashes recalculated. Object replicator performance is generally bound by the number of uncached directories it has to traverse, usually as a result of invalidated suffix directory hashes. In one embodiment, the file storage system 100 is designed so that around 2% of the hash space on a normal storage pool 214 will be invalidated per day.

Updaters

Updaters are implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108, and may include instructions that, when executed by a processor, process updates that may have failed. An updater may be provided with each storage pool (e.g., on a server that includes the storage pool) to process failed updates. For example, there may be times when container or account data will not be immediately updated. Such incidents may occur during failure scenarios or periods of high load. If an update of a stored entity fails, the update is queued in a storage pool 214 on the file storage system 100, and the updater that is associated with that storage pool 214 will process the failed updates. In such situations, a consistency window is used. For example, suppose the container service 210 is under load and a new object is put in to the file storage system 100. The object will be immediately available for reads as soon as the proxy 204 responds to the user 202 that the object has been successfully added to the file storage system 100. However, due to the heavy load, a container service 210 may not have been able to update its object listing, and so that update would be queued for a later update. Container listings, therefore, may not immediately contain the object, although the object has been saved and replicated within the applicable object storage pool area. In one embodiment, the consistency window needs only to be as large as the frequency at which the updater runs.

Auditors

Auditors are implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108, and may include instructions that, when executed by a processor, check the integrity of the objects, containers, and accounts stored in the storage pools 214. If corruption is found (in the case of bit rot, for example), auditors may quarantine the file, and then replication (discussed above) is used to replace the bad file from another replica. If other errors are found they may be logged (for example, an object's listing can't be found on any container storage that it should be on).

Large Object Support

The file storage system 100 may include a limit on the size of a single uploaded object (e.g., 5 GB.) However, the download size of a single object may be made virtually unlimited with the concept of segmentation. Segments of a larger object are uploaded and a special manifest file is created that, when downloaded, sends all the segments, concatenated in order, to emulate a single object. This also offers much greater upload speed by enabling the parallel upload of different segments. For example, a user may specify the segment size to use when splitting a large file (e.g., 1 GB.) The file storage system 100 would then split the large file into 1 G segments and begin uploading those segments in parallel. Once all the segments have been uploaded, a manifest file may created so the segments can be downloaded as one. In one embodiment, all the segments may be uploaded into a second container with names like large_file/1290206778.25/21474836480/00000000, large_file/1290206778.25/21474836480/00000001, etc. In one embodiment, the use of a separate container provides a benefit that the main container listings will not be polluted with all the segment names. The use of a segment name format of <name>/<timestamp>/<size>/<segment> provides that an upload of a new file with the same name won't overwrite the contents of the first until the last moment when the manifest file is updated.

The primary factor driving the limitation of object size in the file storage system 100 is maintaining balance among the partitions of the ring. To maintain an even dispersion of disk usage throughout the file storage system 100, larger objects are split into smaller segments which are then glued together during a read. This design allows the user to support backup and archiving of large data sets, and improves performance and/or reduces errors due to network interruption. The major disadvantage of this method is that knowledge of the original partitioning scheme is required to properly reassemble the object, which is not practical for some use cases, such as CDN origination. In order to eliminate any barrier to entry for clients wanting to store objects larger than 5 GB, a fully transparent support for large object uploads may be provided. A fully transparent implementation supports a larger max size by automatically splitting objects into segments during upload within the proxy without any changes to the client API. All segments are completely hidden from the client API. The "user manifest" design discussed above provides a transparent download of large objects to the client and still provide the uploading client a clean API to support segmented uploads. Alternative "explicit" user manifest options may be provided that include a pre-defined format for listing the segments to "finalize" the segmented upload.

Account Reapers

An account reaper is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108, and may include instructions that, when executed by a processor, remove data from deleted accounts in the background of the file storage system 100. An account may be marked for deletion by a user which may put a value of DELETED into the status column in the account service 212 on a storage pool 214 that includes accounts, indicating the data for the account should be deleted later. In one embodiment, there may be no set retention time and no undelete, as it may be assumed the user will implement such features once it is truly desired that the account's data be removed. The account reaper runs on each account service and storage pool 214 and scans the storage pool 214 occasionally for accounts that are marked for deletion. In one embodiment, the account reaper may only trigger on accounts that storage pool 214 is designated as a "primary" storage pool for so that multiple account services aren't trying to do the same work at the same time. The deletion process works as follows: for each container in the account, each object is deleted and then the container is deleted. Any deletion requests that fail won't stop the overall process, but may cause the overall process to fail eventually (for example, if an object delete times out, the container won't be able to be deleted later and therefore the account won't be deleted either). The overall process continues even on a failure so that it doesn't get hung up reclaiming file storage system space because of one troublesome spot. The account reaper will keep trying to delete an account until it eventually becomes empty, at which point the database replicator will eventually remove the database files.

In one embodiment, deleting an account is accomplished through completely external calls and requires no changes to the file storage system 100. All data is simply deleted in the same way a user would, through the public ReST API. However, this uses proxy resources and logs everything when such actions aren't necessary, and may require a dedicated system for issuing the delete requests. In one embodiment, a completely bottom-up approach may be used where the object and container servers occasionally scan the data they hold, check if the account has been deleted, and removing the data if the account has been deleted. This provides for the quick reclamation of storage space with no impact on the proxies or logging, but a vast majority of the scanning results in no action while creating a relatively high I/O load with no benefit. In one embodiment, the account server marks all the containers for deletion and the container storage deletes the objects in each container and then themselves. This also provides for quick reclamation of storage space for accounts with a lot of containers, but results in a relatively large load spike. In one embodiment, the load spike may be reduced by slowing down the process, but then the benefit of quick reclamation of storage space is lost while providing a more complex process. In one embodiment, a database replicator scans all the containers for those marked for deletion while performing a replication scan.

Ring Data Structure

The list of available areas in the storage pool 214 is known internally to the Ring. In one embodiment, each item in the list of storage pool 214 is a dictionary with the following keys:
TABLE-US-00001 id integer The index into the list storage pools 214. zone integer The zone the storage pool 214 resides in. weight float The relative weight of the storage pool 214 in comparison to other storage pools 214. This usually corresponds directly to the amount of disk space the storage pool 214 has compared to other storage pools 214. For instance a storage pool 214 with 1 terabyte of space might have a weight of 100.0 and another storage pool 214 with 2 terabytes of space might have a weight of 200.0. This weight can also be used to bring back into balance a storage pool 214 that has ended up with more or less data than desired over time. A good average weight of 100.0 allows flexibility in lowering the weight later if necessary. ip string The IP address(es) of the storage server(s) 108 providing the storage pool 214. port int The TCP port the listening storage server process uses that serves requests for the storage pool 214. device string The on disk name of the storage pool 214 on the storage server(s). For example: sdb1 meta string A general-use field for storing additional information for the storage pool 214. This information isn't used directly by the storage server processes, but can be useful in debugging. For example, the date and time of installation and hardware manufacturer could be stored here.

In one embodiment, the list of storage pools 214 contains holes, or indexes set to None, for storage pools 214 that have been removed from the cluster. Generally, storage pool ids are not reused. Also, some storage pools 214 may be temporarily disabled by setting their weight to 0.0.

Partition Assignment List

This is a list of array('I') of storage pool ids. The outermost list contains an array('I') for each replica. Each array('I') has a length equal to the partition count for the ring. Each integer in the array('I') is an index into the above list of storage pool 214.

Partition Shift Value

The partition shift value is known internally to the Ring. This value used to shift an MD5 hash to calculate the partition on which the data for that hash should reside. Only the top four bytes of the hash is used in this process.

In one embodiment, a "live ring" option may be used where each storage server 108 maintains its own copy of the ring and the storage servers 108 use a gossip protocol to communicate when changes made. In one embodiment, all ring lookups are done by calling a service on a separate server or set of servers. In one embodiment, servers submit change requests to a ring server to have a new ring built and shipped back out to the servers. The ring 206 described above has each replica of a partition independently assigned to a storage pool 214. In one embodiment, a ring may be created that uses a third of the memory of the ring 206 by assigning the first replica of a partition directly while determining the other two replicas by "walking" the ring until additional storage pools 214 are found in other zones. In another embodiment, partition to storage pool 214 assignments are not stored in a big list in memory but rather each storage pool 214 is assigned a set of hashes or anchors. The partition is then determined from the data item's hash and the nearest storage pool 214 anchors determine where the replicas should be stored.

Various hashing algorithms may be used in different embodiments. The Secure Hash Algorithm (SHA) offers relatively good security but may be slower. MurmurHash may be used as a relatively faster option as compared to SHA. MD5 Hash is desirable for its general availability, good distribution, and adequate speed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of building one or more rings for maintaining data in a file storage system, comprising:
    determining a number of partitions for each storage pool in the file storage system, wherein the number of partitions is based on a storage capacity of the respective storage pool;
    placing the storage pools in a sorting order based on the number of partitions;
    assigning partitions to storage pools based on the sorting order, but subject to a zone restriction that the storage pool to which a partition is being assigned is not in a same zone as any other storage pool that includes a partition replica for the partition; and
    maintaining the sorting order as partitions are assigned to storage pools in the file storage system, wherein maintaining the sorting order includes decrementing the respective number of partitions for the respective storage pool to which the respective partition has been assigned.

2. The method of claim 1, wherein the number of partitions is based on a weight of the respective storage pool.

3. The method of claim 1, further including:
    determining a partition power for the respective storage pool; and
    calculating 2 to the partition power, wherein the number of partitions is based on a result of the calculating.

4. The method of claim 3, further including:
    assigning N partitions to the respective storage pool, wherein N is a result of the calculating 2 to the partition power.

5. The method of claim 1, wherein the placing the storage pools in a sorting order including placing the storage pools in an order from the highest number of partitions to the lowest number of partitions.

6. The method of claim 5, further including:
maintaining the sorting order as partitions are assigned to storage pools in the file storage system.

7. The method of claim 1, wherein the assigning partitions to storage pools includes assigning partitions to a storage pool with the highest number of partitions.

8. The method of claim 1, wherein the maintaining further includes moving the respective storage pool to a lower position in the sorting order.

9. The method of claim 1, wherein each partition is assigned multiple storage pools in different zones.

10. The method of claim 1, further including:
receiving an object;
associating the object with a set of partitions assigned to storage pools in different zones; and
storing a replica of the object in each partition of the set of partitions.

11. The method of claim 1, wherein a ring is an object ring.

12. The method of claim 1, wherein a ring is a container ring.

13. The method of claim 1, wherein a ring is an account ring.

14. A non-transitory computer readable medium containing executable instructions, which when executed on one or more processors:
determines a number of partitions for each storage pool in the file storage system wherein the number of partitions is based on a storage capacity of the respective storage pool;
places the storage pools in a sorting order based on the number of partitions;
assigns partitions to storage pools based on the sorting order, but subject to a zone restriction that the storage pool to which a partition is being assigned is not in a same zone as any other storage pool that includes a partition replica for the partition; and
maintains the sorting order as partitions are assigned to storage pools in the file storage system, wherein maintaining the sorting order includes decrementing the respective number of partitions for the respective storage pool to which the respective partition has been assigned.

15. The computer readable medium of claim 14, wherein the number of partitions is based on a weight of the respective storage pool.

16. The computer readable medium of claim 14, the executable instructions further including:
determining a partition power for the respective storage pool;
calculating 2 to the partition power; and
assigning N partitions to the respective storage pool, wherein N is a result of the calculating 2 to the partition power.

* * * * *